(12) United States Patent
Jones et al.

(10) Patent No.: US 10,344,149 B2
(45) Date of Patent: Jul. 9, 2019

(54) HIGH MELT FLOW THERMOPLASTIC POLYOLEFINS WITH MODIFIER

(71) Applicant: Dow Global Technologies LLC, Midland, MI (US)

(72) Inventors: Mary Ann Jones, Midland, MI (US); Kim L. Walton, Lake Jackson, TX (US); Jeffrey C. Munro, Bellaire, TX (US); Yushan Hu, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 46 days.

(21) Appl. No.: 15/572,561

(22) PCT Filed: May 4, 2016

(86) PCT No.: PCT/US2016/030795
§ 371 (c)(1),
(2) Date: Nov. 8, 2017

(87) PCT Pub. No.: WO2016/182817
PCT Pub. Date: Nov. 17, 2016

(65) Prior Publication Data
US 2018/0282533 A1    Oct. 4, 2018

Related U.S. Application Data

(60) Provisional application No. 62/159,437, filed on May 11, 2015.

(51) Int. Cl.
*C08L 53/00*    (2006.01)
*C08L 23/08*    (2006.01)
(Continued)

(52) U.S. Cl.
CPC ........... *C08L 23/0815* (2013.01); *C08J 3/005* (2013.01); *C08L 23/10* (2013.01); *C08L 23/14* (2013.01);
(Continued)

(58) Field of Classification Search
CPC . C08L 53/00; C08L 2205/035; C08L 2205/06
See application file for complete search history.

(56) References Cited

U.S. PATENT DOCUMENTS 5,763,534 A    6/1998  Srinivasan et al.
6,372,847 B1   4/2002  Wouters
(Continued)

OTHER PUBLICATIONS

PCT/US2016/030795, International Search Report and Written Opinion dated Jun. 9, 2016.
(Continued)

*Primary Examiner* — Mark S Kaucher (57) ABSTRACT

Embodiments relate to a high melt flow thermoplastic polyolefin composition and of a method of preparing a high melt flow thermoplastic polyolefin composition, in which the composition includes from 5 wt % to 45 wt % of a modifier including a blend of from 5 wt % to 40 wt % of a block composite and from 60 wt % to 95 wt % of a polyolefin copolymer, based on a total weight of the modifier, and from 30 wt % to 95 wt % of a polypropylene polymer base that has a melt flow rate of at least 40 g/10 min. The high melt flow thermoplastic polyolefin composition has a blended melt flow rate of at least 25 g/10 min and an MFR ratio is less than 2.0, the MFR ratio being a ratio of the melt flow rate of the polypropylene polymer base to the blended melt flow rate of the high melt flow thermoplastic polyolefin composition.

10 Claims, 5 Drawing Sheets

(51) Int. Cl.
*C08L 23/14* (2006.01)
*C08L 23/10* (2006.01)
*C08J 3/00* (2006.01)

(52) U.S. Cl.
CPC ........... *C08L 53/00* (2013.01); *C08J 2323/08* (2013.01); *C08J 2453/00* (2013.01); *C08L 2205/03* (2013.01); *C08L 2205/035* (2013.01); *C08L 2205/06* (2013.01)

(56) References Cited

U.S. PATENT DOCUMENTS

| | | |
|---|---|---|
| 6,395,671 B2 | 5/2002 | LaPointe |
| 7,608,668 B2 | 10/2009 | Li Pi Shan et al. |
| 7,858,706 B2 | 12/2010 | Arriola et al. |
| 7,858,707 B2 | 12/2010 | Arriola et al. |
| 7,951,882 B2 | 5/2011 | Arriola et al. |
| 8,053,529 B2 | 11/2011 | Carnahan et al. |
| 8,476,366 B2 | 7/2013 | Walton et al. |
| 8,686,087 B2 | 4/2014 | Li Pi Shan et al. |
| 8,716,400 B2 | 5/2014 | Carnahan et al. |
| 2012/0208961 A1 | 8/2012 | Carnahan et al. |

OTHER PUBLICATIONS

PCT/US2016/030795, International Preliminary Report on Patentability dated Nov. 14, 2017.

HIGH MELT FLOW THERMOPLASTIC POLYOLEFINS WITH MODIFIER

FIELD

Embodiments relate to a high melt flow thermoplastic polyolefins with a modifier, methods of making the high melt flow thermoplastic polyolefins, and products that incorporate the high melt flow thermoplastic polyolefins.

INTRODUCTION

As discussed in U.S. Pat. Nos. 8,476,366 and 8,686,087, manufacturers of elastomeric parts continue searching for elastomers with processing characteristics that allow them to attain any or all of higher rates of productivity, improved quality, and broader markets. For example, blends for use in or as thermoplastic polyolefins are sought, such as modified and/or compatibilized blends for forming high melt flow thermoplastic polyolefin blends.

For thermoplastic polyolefin blends, high levels of ductility and modulus/heat resistance and viscosities that allow for the easy filling with respect to the intended use (such flowability over long, thin flow paths) are sought. For example, the thermoplastic polyolefin blends may be used in the automotive industry for large injection molded parts (such as interior parts, e.g., instrument panels, door panels, and A-pillars, and exterior parts, e.g., bumper fasciae). Further, as the automotive industry is working to reduce fuel consumption via lighter weight vehicles, the ability to mold thinner (e.g., a thickness of 2.5 mm or less) thermoplastic polyolefin based parts that can reduce weight is also sought. However, lower viscosity and higher melt flow rate resin may be needed to fill a thinner part at acceptable injection pressures and clamp pressures (e.g., with existing equipment). Relatively lower viscosity and higher melt flow rate thermoplastic polyolefins may be produced by lowering the molecular weight of a polymer matrix and/or the molecular weight of an elastomer phase in the blend. However, this may reduce the low temperature ductility of a resultant molded article, which is a safety concern. Accordingly, it is desirable to balance both viscosity/melt flow rate of a composition for forming an article with low temperature ductility of the resultant article.

SUMMARY

Embodiments may be realized by providing a high melt flow thermoplastic polyolefin composition and of a method of preparing a high melt flow thermoplastic polyolefin composition, in which the composition includes (1) from 5 wt % to 45 wt % of a modifier including a blend of (a) from 5 wt % to 40 wt % of a block composite, based on a total weight of the modifier, the block composite including (i) an ethylene-propylene copolymer, (ii) an isotactic polypropylene polymer, and (iii) a block copolymer including an ethylene propylene soft block that has essentially a same composition as the ethylene propylene polymer and an isotactic polypropylene hard block that has essentially a same composition as the isotactic polypropylene polymer, the soft block comprising from 20 wt % to 80 wt % of ethylene based on a total weight of the soft block, and the block copolymer including from 20 wt % to 75 wt % of the hard block, based on the total weight of the block copolymer, and (b) from 60 wt % to 95 wt % of a polyolefin copolymer, based on a total weight of the modifier, the polyolefin copolymer being derived from ethylene and at least one of a C3 to C10 alpha-olefin, and the polyolefin copolymer having a melt index from 10 g/10 min to 1500 g/10 min, according to ASTM D1238 and at 190° C./2.16 kg, and a density from 0.850 g/cm3 to 0.900 g/cm3, and (2) from 30 wt % to 95 wt % of a polypropylene polymer base that has a melt flow rate of at least 40 g/10 min, according to ASTM D 1238 and at 230° C./2.16 kg. The high melt flow thermoplastic polyolefin composition has a blended melt flow rate of at least 25 g/10 min, according to ASTM D1238 and at 230° C./2.16 kg, and an MFR ratio of less than 2.0, the MFR ratio being a ratio of the melt flow rate of the polypropylene polymer base to the blended melt flow rate of the high melt flow thermoplastic polyolefin composition.

BRIEF DESCRIPTION OF THE DRAWINGS

Features of the embodiments will become more apparent to those of ordinary skill in the art by describing in detail exemplary embodiments thereof with reference to the attached figures in which.

DETAILED DESCRIPTION

Generally, a drop in impact performance/resistance is experienced as the melt flow rate of a propylene based thermoplastic polyolefin composition is increased. As such, it may be difficult to produce easy flow thermoplastic polyolefin compositions for the molding of thin-wall parts, while still providing desired low temperature ductility performance. Accordingly, to balance both viscosity/melt flow rate of the thermoplastic polyolefin composition for forming an article with low temperature ductility, the use of a modifier that includes both a block composite (e.g., as a compatibilizer) and polyolefin copolymer with a high melt index (i.e., a melt index of at least 10 g/10 min according ASTM D1238 and at 190° C./2.16 kg) is proposed. The modifier may be pre-blended.

Terms

"Composition" and like terms mean a mixture or blend of two or more components. For example, one composition is the combination of a random or homogeneous propylene-based interpolymer and a block composite nucleator.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc. The terms "ethylene/alpha-olefin polymer" and "propylene/alpha-olefin polymer" are indicative of interpolymers as described below.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Propylene-based polymer," and like terms mean a polymer that comprises a majority weight percent polymerized propylene monomer (based on the total amount of polymerizable monomers), and optionally comprises at least one polymerized comonomer different from propylene so as to form a propylene-based interpolymer. For example, when the propylene-based polymer is a copolymer, the amount of propylene may be greater than 50 wt %, based on the total weight of the copolymer. "Units derived from propylene" and like terms mean the units of a polymer that formed from the polymerization of propylene monomers. "Units derived from α-olefin" and like terms mean the units of a polymer that formed from the polymerization of α-olefin monomers, in particular at least one of a $C_{3-10}$ α-olefin. In contrast, "Ethylene-based polymer" and like terms mean a polymer that comprises a majority weight percent polymerized ethylene monomer (based on the total weight of polymerizable monomers), and optionally may comprise at least one polymerized comonomer different from ethylene so as to form an ethylene-based interpolymer. For example, when the ethylene-based polymer is a copolymer, the amount of ethylene may be greater than 50 wt %, based on the total weight to the copolymer.

"Random propylene-based copolymer" and like terms mean a propylene/α-olefin interpolymer in which the units derived from the α-olefin monomer are randomly distributed across the polymer chain, as opposed to distributed across the polymer chain in an alternating, periodic, or block pattern. An exemplary random propylene-based interpolymer, is a random propylene-based copolymer. In contrast, "homogeneous propylene-based interpolymer" and like terms mean a propylene/α-olefin interpolymer in which the units derived from the α-olefin monomer are randomly and approximately evenly distributed across the polymer chains of the bulk polymer.

"Impact modified propylene-based copolymer" and the like terms mean a propylene based polymer composition that has been impact modified such that the composition's notched Izod impact strength at room temperature or below is maintained or increased as compared to said given composition's notched Izod impact strength at the same temperature without the added impact modifier.

"Block composite" and the like terms mean a composite that includes a soft copolymer, a hard polymer, and a block copolymer having a soft segment/block and a hard segment/block, wherein the hard segment of the block copolymer is essentially the same composition as the hard polymer in the block composite and the soft segment of the block copolymer is essentially the same composition as the soft copolymer of the block composite. In particular, the block composite includes a hard polymer that includes polypropylene and a soft polymer that includes ethylene (an ethylene-propylene polymer).

"Block copolymer" refers to a polymer comprising two or more chemically distinct regions or segments (referred to as "blocks") joined in a linear manner, that is, a polymer comprising chemically differentiated units that are joined (covalently bonded) end-to-end with respect to polymerized functionality (e.g., polymerized propylenic functionality), rather than in pendent or grafted fashion. Block copolymers comprise sequences ("blocks") of the same monomer unit, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply. It may further comprise additional blocks of different type. Multi-block copolymers may be linear multi-block, multi-block star polymers (in which all blocks bond to the same atom or chemical moiety) or comb-like polymers where the B blocks are attached at one end to an A backbone. The block copolymers can be linear or branched. With respect to the block copolymers, the blocks may differ in the amount of comonomer incorporated therein. The blocks may also differ in the type of comonomer, density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of polymer polydispersity (PDI or Mw/Mn), block length distribution, and/or block number distribution, e.g., due to the effect of the shuttling agent(s) in combination with the catalyst(s).

"Hard" segments/blocks refer to highly crystalline blocks of polymerized units. The term "Soft" segments/blocks refer to amorphous, substantially amorphous, or elastomeric blocks of polymerized units. "Crystalline" refers to a polymer or polymer block that possesses a first order transition or crystalline melting point (Tm) as determined by differential scanning calorimetry (DSC) or equivalent technique. The term may be used interchangeably with the term "semi-crystalline". The term "crystallizable" refers to a monomer that can polymerize such that the resulting polymer is crystalline. Crystalline propylene polymers may have, but are not limited to, densities of 0.88 g/cc to 0.91 g/cc and melting points of 100° C. to 170° C. "Amorphous" refers to a polymer lacking a crystalline melting point as determined by differential scanning calorimetry (DSC) or equivalent technique.

"Isotactic" is defined as polymer repeat units having at least 70 percent isotactic pentads as determined by $^{13}$C-NMR analysis. "Highly isotactic" is defined as polymers having at least 90 percent isotactic pentads.

Composition

According to embodiments, a composition for forming a high melt flow thermoplastic polyolefin composition (e.g., for use in injection molding automotive parts) includes at least a propylene polymer base and a modifier. The polypropylene polymer base that has a melt flow rate of at least 40 g/10 min, according to ASTM D 1238 and at 230° C./2.16 kg. By high melt flow it is meant that a blended melt flow rate of the thermoplastic polyolefin composition is at least 25 g/10 min (e.g., at least 30 g/10 min, at least 35 g/10 min, and/or at least 40 g/10 min), according to ASTM D1238 and at 230° C./2.16 kg. The melt flow rate may be less than 1200 g/10 min. The high melt flow thermoplastic polyolefin composition has an MFR ratio that is less than 2.0, the MFR ratio being a ratio of the melt flow rate of the polypropylene polymer base to the blended melt flow rate of the high melt flow thermoplastic polyolefin composition. For example, the MFR ratio may be greater than 0.5, greater than 0.7, and/or greater than 1.0. Exemplary ranges for the MFR ratio include from 1.00 to 1.95 and from 1.15 to 1.95.

The composition includes from 5 wt % to 45 wt % of the modifier, based on the total weight of the composition. For example, the amount of the modifier may be from 10 wt % to 45 wt %, from 15 wt % to 40 wt %, from 20 wt % to 40 wt %, from 25 wt % to 35 wt %, and/or from 28 wt % to 32 wt %, based on the total weight of the composition. The block composite and the polyolefin copolymer may be pre-blended prior to blending the modifier with propylene polymer base such that the composition includes the modifier finely dispersed in polypropylene. In another exemplary embodiment, the components of the modifier blend may be individually added at the time of preparation of the article, e.g., by feeding the propylene polymer base along with the modifier blend components together in one-step in to an injection molding machine. In another exemplary embodiment, the modified propylene may be prepared by melt blending all of the individual components of the modifier blend along with the propylene polymer base together and then pelletized for a ready-to-feed modified propylene. This pelletized modified propylene may then be fed directly into a process, e.g., to for an article by injection molding.

The modifier includes from 5 wt % to 40 wt % (e.g., 10 wt % to 40 wt %, 15 wt % to 35 wt %, 15 wt % to 30 wt %, 15 wt % to 25 wt %, and/or 18 wt % to 22 wt %) of a block composite that includes a block copolymer. The block composite may include one or more block composites. The modifier further includes from 60 wt % to 95 wt % (e.g., 60 wt % to 95 wt %, 70 wt % to 95 wt %, and/or 75 wt % to 85 wt %) of a polyolefin copolymer that has a relatively high melt flow rate and a relatively low density. The modifier may optionally include from 0 wt % to 30 wt % (e.g., 10 wt % to 30 wt %, 15 wt % to 25 wt %, and/or 18 wt % to 22 wt %) of at least one additional copolymer. The additional copolymer may be miscible with polypropylene. Exemplary additional copolymers are available from The Dow Chemical Company under the tradenames ENGAGE™ and VERSIFY™, and from Kraton Performance Polymers under the family designation Kraton®, such as the enhanced rubber segment Kraton® G1643M and Kraton® G1645M grades. For example, the additional copolymer may be derived from propylene and ethylene and/or butene.

With respect to the composition, without intending to be bound by this theory, the blend of the propylene polymer base (e.g., such as a polypropylene homopolymer) and the block copolymer that has a continuous polypropylene phase would result in relatively smaller and discrete rubber domains in comparison to a simple polypropylene/elastomer blend. The block copolymer could compatibilize the composition such that the propylene polymer base could be considered impact-modified with improved toughness at low temperatures. Accordingly, the resultant composition would have improved impact modification, while still having a high melt flow rate.

For example, an injection molded article formed with the high melt flow thermoplastic composition may have a multi-axial impact ductile brittle transition temperature measured according to ASTM D3763 and/or a notched-Izod impact ductile-brittle transition temperature measured according to ASTM D256, that is less than 0° C. For example, in exemplary embodiments at least the multi-axial impact ductile brittle transition temperature measured according to ASTM D3763 is less than 0° C. As discussed with respect to the examples, the multi-axial impact measurements may be run at 6.7 m/s on a 4-inch (102 mm) diameter, 0.125 inch (3.175 mm) thick injection molded disk. Further, as discussed with respect to the examples, the notched-Izod impact ductile-brittle transition temperature may be measured on samples that are notched 1-16 hours after injection molding and may utilize bars that are aged for 40 hours after notching at 23° C./50% relative humidity. Parts may be placed in a freezer at testing temperatures for a minimum of 4 hours when testing at sub-ambient temperatures.

In exemplary embodiments, the multi-axial impact ductile brittle transition temperature measured and/or the notched-Izod impact ductile-brittle transition may be at least 5° C. lower for the high melt flow thermoplastic polyolefin composition than another composition that includes the same components except the block composite is excluded, when the multi-axial impact ductile-brittle transition temperature and/or the notched-Izod impact ductile-brittle transition temperature is measured at the same conditions for both the high melt flow thermoplastic polyolefin composition and the other composition. For example, at least the multi-axial impact ductile brittle transition temperature measured may be at least 5° C. lower for the high melt flow thermoplastic polyolefin composition than another composition that includes the same components except the block composite is excluded, when the multi-axial impact ductile-brittle transition temperature is measured at the same conditions for both the high melt flow thermoplastic polyolefin composition and the other composition.

The temperature of forming the polymer blend of the modifier with the propylene polymer base may be above the melting temperature of the propylene polymer base. For example, the temperature may be from 240° C. to 270° C., e.g., in order to form a homogeneous melt blend. The temperature for forming the modifier, when pre-blended, may be from 150° C. to 230° C. and/or from 200° C. to 225° C. For example, the temperature for pre-blending the modifier may be lower than the temperature for forming the polymer blend with the modifier and the propylene polymer base. The polymer blend with the modifier and the propylene polymer base may have a relatively low viscosity blend and a relatively higher melt flow rate, compared to traditional modifiers in polypropylene.

The composition may include one or more optional additives. Exemplary additives include a colorant or pigment, a filler, a reinforcer, a lubricant, an antioxidant, a UV stabilizer, a slip agent, an anti-blocking agent, a plasticizer, an antifogging agent, a flow aid, a coupling agent, a cross-linking agent, a nucleating agent, a surfactant, a solvent, a flame retardant, an antistatic agent, an anti-degradant, a softener, a wax, and combinations thereof.

The composition (polymer blends) may be used to prepare as articles with known polymer processes such as extrusion (e.g., extrusion coating) and molding (e.g., injection molding and rotational molding). For example, in general, extrusion is a process by which a polymer is propelled continuously along a screw through regions of high temperature and pressure where it is melted and compacted, and finally forced through a die. The extruder may be a single screw extruder, a multiple screw extruder, a disk extruder or a ram extruder. The die may be a profile extrusion die or an extrusion coating die. Injection molding is used for manufacturing a variety of plastic parts for various applications. The injection molding process may include structural foam injection molding and/or microcellular injection molding. In general, injection molding is a process by which a polymer is melted and injected at high pressure into a mold, which is the inverse of the desired shape, to form parts of the desired shape and size. The mold can be made from metal, such as steel and aluminum. Molding is generally a process by which a polymer is melted and led into a mold, which is the inverse of the desired shape, to form parts of the desired shape and size. Molding may be pressureless or pressure-assisted. In exemplary embodiments, automotive parts are prepared using the high melt flow thermoplastic polyolefin composition and an injection molding process. The category of injection molding processes includes structural foam injection molding and microcellular injection molding.

For example, the composition may be used in the automotive industry to form lighter weight and/or thin parts for use on interior and/or exterior automotive applications (e.g., auto parts). Exemplary auto parts include instrument panels, door panels, pillars, and bumper fascia.

Block Composite

In embodiments, the block composite includes (i) an ethylene-propylene copolymer (also referred to as a soft polymer), (ii) an isotactic polypropylene polymer (also referred to as a hard polymer), and (iii) a block copolymer including an ethylene propylene block (also referred to as an EP soft block and soft segment) that has essentially a same composition as the ethylene propylene polymer and an isotactic polypropylene block (also referred to as an iPP hard block and hard segment) that has essentially a same composition as the isotactic polypropylene polymer. With respect to the block copolymer, the soft block comprises from 20 wt % to 80 wt % (e.g., 30 wt % to 80 wt %, 40 wt % to 80 wt %, 50 wt % to 80 wt %, 55 wt % to 75 wt %, 60 wt % to 70 wt %, and/or 63 wt % to 68 wt %) of ethylene based on a total weight of the soft block, with the remainder in the soft block being propylene. The hard block of the block copolymer includes less than 5 wt % and/or less than 4.5 wt % of ethylene, and optionally greater than 0.5 wt %, with a remainder of isotactic polypropylene that has a similar composition. For example, the hard block may include from 1.5 wt % to 4.1 wt % of ethylene and/or 2.1 wt % to 3.5 wt % of ethylene. Further, the block copolymer includes from 20 wt % to 75 wt % (e.g., 20 wt % to 65 wt %, 20 wt % to 55 wt %, 20 wt % to 50 wt %, 20 wt % to 40 wt %, 25 wt % to 35 wt %, and/or 28 wt % to 32 wt %) of the hard block, with the remainder being the soft block, based on the total weight of the block copolymer.

Said in another way, the hard segment of the block copolymer refers to highly crystalline blocks of polymerized units in which a monomer (i.e., isotactic polypropylene) is present in an amount greater than 95 wt % and/or greater than 98 wt %. The soft segment includes from 20 wt % to 80 wt % of a comonomer (i.e., ethylene) and less than 80 wt % of the monomer (i.e., propylene). For example, soft segments refer to amorphous, substantially amorphous or elastomeric blocks of polymerized units in which the comonomer content is greater than 10 mol %. The weight percent of hard segments in the block copolymer may be from 20 wt % to 75 wt % (with the remainder being soft segments).

The melting temperature of the block composite may be from 120° C. to 150° C. (e.g., 135° C. to 145° C.). The overall ethylene content in the block composite may be from 5 wt % to 70 wt % (e.g., 10 wt % to 70 wt %, from 25 wt % to 70 wt %, from 30 wt % to 60 wt %, from 35 wt % to 55 wt %, from 35 wt %, to 45 wt %, etc.), based on the total weight of the block composite. The molecular weight of the block composite may be from 50,000 to 1,000,000 g/mol. For example, the molecular weight may be from 100 kg/mol to 200 kg/mol (e.g., 100 kg/mol to 150 kg/mol, 105 kg/mol to 130 kg/mol, 110 kg/mol to 125 kg/mol, 115 kg/mol to 125 kg/mol, 117 kg/mol to 122 kg/mol, etc.).

An iPP-EP block copolymer (a polypropylene-based olefin block copolymer comprising iPP hard blocks and ethylene-propylene soft blocks) may offer a compatiblization solution to reduce the domain sizes of the elastomer phase when blended in a propylene polymer base. This may form compatibilized blends of polypropylene and elastomers offer a wider range of thermodynamically-stable compositions with morphologies finer than those achievable with classical blends, resulting in unique combinations of properties.

The block composite is characterized as having a block composite index equal to or greater than 0.1 and up to 1. For example, the block composite index may be from 0.1 to 0.9, from 0.1 to 0.8, from 0.1 to 0.7, from 0.1 to 0.6, from 0.1 to 0.5, etc. The block copolymer is characterized as having a molecular weight distribution, Mw/Mn, greater than about 1.3. For example the Mw/Mn may be from 1.4 to 5.0, from 1.7 to 3.5, and/or from 1.7 to 2.6.

The block composite may have a melt flow rate from 2 g/10 min to 500 g/10 min, according to ASTM D 1238 and at 230° C./2.16 kg. For example, melt flow rate may be form 2 g/10 min to 350 g/10 min, 2 g/10 min to 250 g/10 min, 2 g/10 min to 150 g/10 min, 2 g/10 min to 100 g/10 min, 2 g/10 min to 50 g/10 min, 2 g/10 min to 30 g/10 min, 2 g/10 min to 25 g/10 min, 2 g/10 min to 20 g/10 min, 2 g/10 min to 15 g/10 min, 3 g/10 min to 10 g/10 min, and/or 4 g/10 min to 7 g/10 min. The melt flow rate of the block composite may be less than the melt index (based on g/10 min according to ASTM D1238 and at 190° C./2.16 kg) of the polyolefin copolymer included in the modifier.

The block composites include the block copolymers possessing a most probable distribution of block lengths. The block copolymers contain 2 or more blocks or segments (e.g., 2 or 3 blocks). In a process for making the polymers of the block composite, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged intramolecularly.

The block composite polymers are prepared, e.g., by a process comprising contacting an addition polymerizable monomer or mixture of monomers under addition polymerization conditions with a composition comprising at least one addition polymerization catalyst, a cocatalyst, and a chain shuttling agent. The process is characterized by formation of at least some of the growing polymer chains under differentiated process conditions in two or more reactors operating under steady state polymerization conditions or in two or more zones of a reactor operating under plug flow polymerization conditions.

Suitable processes useful in producing the block composites may be found in, e.g. example, U.S. Pat. Nos. 8,053,529, 8,686,087, and 8,716,400. The polymerization may be carried out as a continuous polymerization, e.g., a continuous-solution polymerization, in which catalyst components, monomers, and optionally solvent, adjuvants, scavengers, and/or polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Further, a chain shuttling agent(s) may be added at any point during the polymerization including in a first reactor or zone, at the exit or slightly before the exit of the first reactor, between the first reactor or zone and a second or any subsequent reactor or zone, or even solely to the second or any subsequent reactor or zone. Exemplary chain shuttling agents, catalysts, and cocatalysts are those disclosed in, e.g., U.S. Pat. No. 7,951,882. For example, chain shuttling agents that are dialkyl zinc compounds may be used.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

Due to the difference in monomers, temperatures, pressures, or other differences in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes. Each reactor in the series can be operated under high pressure, solution, slurry, or gas phase polymerization conditions.

In the following exemplary processes, continuous or substantially continuous polymerization conditions may be employed. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. A high pressure process may be carried out at temperatures from 100° C. to 400° C. and at pressures above 500 bar (50 MPa). A slurry process may use an inert hydrocarbon diluent and temperatures of from 0° C. up to a temperature just below the temperature at which the resulting polymer becomes substantially soluble in the inert polymerization medium. Exemplary temperatures in a slurry polymerization are from 30° C. and pressures may range from atmospheric (100 kPa) to 500 psi (3.4 MPa).

Without limiting in any way the scope of the embodiments, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Exemplary solvents include $C_{4-10}$ hydrocarbons or mixtures thereof, especially alkanes such as hexane or mixtures of alkanes, as well as one or more of the monomers employed in the polymerization. Catalyst along with cocatalyst and optionally chain shuttling agent are continuously or intermittently introduced in the reactor liquid phase or any recycled portion thereof at a minimum of one location.

The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. For example, use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent. The resulting polymer product is recovered by flashing off volatile components of the reaction mixture such as residual monomers or diluent at reduced pressure, and, if necessary, conducting further devolatilization in equipment such as a devolatilizing extruder.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

High Melt Flow Polyolefin Copolymer

In embodiments, the polyolefin copolymer is derived from ethylene and at least one of a $C_3$ to $C_{10}$ alpha-olefin or is derived from propylene and at least one of a $C_2$ and $C_4$ to $C_{10}$ alpha-olefin. For example, the polyolefin copolymer may be an ethylene-propylene copolymer, an ethylene-butylene copolymer, an ethylene-hexene copolymer, and/or an ethylene-octene copolymer. The polyolefin copolymer may be a random or an olefin block copolymer different from the block copolymer of the block composite discussed above. The olefin block copolymer may be made via a process described in U.S. Pat. Nos. 7,608,668, 7,858,706, and/or 7,858,707. The polyolefin copolymer has a melt index such that the melt index is from 10 g/10 min to 1500 g/10 min, according to ASTM D1238 and at 190° C./2.16 kg. For example, the melt index may be from 10 g/10 min to 1000 g/10 min, 10 g/10 min to 500 g/10 min, 10 g/10 min to 300 g/10 min, 10 g/10 min to 100 g/10 min, 10 g/10 min to 50 g/10 min, and/or 10 g/10 min to 40 g/10 min. The polyolefin copolymer has a relatively low density such that the density is from 0.854 g/cm$^3$ to 0.900 g/cm$^3$, according to ASTM D792. For example, the density may be from 0.860 g/cm$^3$ to 0.890 g/cm$^3$, 0.860 g/cm$^3$ to 0.885 g/cm$^3$, 0.865 g/cm$^3$ to 0.880 g/cm$^3$, 0.870 g/cm$^3$ to 0.879 g/cm$^3$, and/or 0.872 g/cm$^3$ to 0.876 g/cm$^3$.

The polyolefin copolymer may have a low glass transition temperature, e.g., less than −30° C., less than −40° C., and/or less than −50° C. The glass transition temperature ($T_g$) may be greater than −80° C. The Brookfield viscosity (@ 350° F./177° C.) may be from 1,000 cP to 25,000 cP (e.g., from 3000 cP to 20,000 cP, from 5000 cP to 20,000 cP, from 10,000 cP to 20,000 cP, and/or from 15,000 cP to 20,000 cP).

The polyolefin copolymer may have a low weight average molecular weight (Mw), e.g., less than or equal to 70,000 g/mole, less than or equal to 50,000 g/mole, and/or less than or equal to 40,000 g/mole. The weight average molecular weight (Mw) may be greater than or equal to 10,000 g/mole, greater than or equal to 20,000 g/mole, and/or greater than or equal to 30,000 g/mole.

Exemplary polyolefin copolymers that may be used in the modifier are available from The Dow Chemical Company under the tradenames ENGAGE™ and INFUSE™.

Polypropylene Polymer Base

The composition includes from 30 wt % to 95 wt % of the propylene polymer base that has a melt flow rate of at least 40 g/10 min (e.g., from 40 g/10 min to 200 g/10 min, from 40 g/10 min to 150 g/10 min, from 40 g/10 min to 120 g/10 min, and/or from 65 g/10 min to 115 g/10 min), according to ASTM D 1238 and at 230° C./2.16 kg. For example, the melt flow rate may be at least 60 g/10 min, according to ASTM D 1238 and at 230° C./2.16 kg. The propylene polymer base may include one or more polypropylene based polymers that have a melt flow rate of at least 40 g/10 min, according to ASTM D 1238 and at 230° C./2.16 kg. In exemplary embodiments, the composition may consist essentially of the modifier and the propylene polymer base. The propylene polymer base may include a random copolymer polypropylene that has an ethylene content from 0.5 wt % to 5.0 wt %, based on the total weight of the random copolymer polypropylene. The propylene polymer base may include 95 wt % to 100 wt % of the random copolymer polypropylene based on the total weight of the propylene polymer base.

The polypropylene polymer base may include polypropylene in the isotactic form of a homopolymer polypropylene and/or other forms of polypropylene can also be used (e.g., syndiotactic or atactic). The polypropylene polymer base may include an impact copolymer, which includes a rubber phase dispersed in propylene. The molecular weight and hence the melt flow rate of the polypropylene used may vary depending upon the application. A discussion of various polypropylene polymers is contained in, e.g., Modern Plastics Encyclopedia/89, mid October 1988 Issue, Volume 65, Number 11, pp. 86-92.

The propylene polymer base may include clarifying and/or nucleating agents therewithin. For example, clarifying and/or nucleating agents may alter the way polypropylene chains crystallize and agglomerate in a molten state. These agents may increase the onset of crystallization temperature. Clarifying agents (or clarifiers) are usually organic, non-polymeric molecules. The clarifying generally also may act as nucleating agents, but nucleating agents are not necessarily clarifying agents. Exemplary clarifiers are chemical derivatives of dibenzylidene sorbitol and have melting temperatures within the processing window of polypropylene resins. Nucleating agents generally are inorganic materials with a small average particle size and a high melting point. When a nucleated resin is melted in an extruder, the nucleating agent may typically remain solid and provide a site around which polypropylene spherulites can form. Exemplary nucleating agents are chemical derivatives of benzoic acid. For example, the nucleating agent may be sodium benzoate, kaolin, and/or talc.

EXAMPLES

All parts and percentages are by weight unless otherwise indicated.

Test Methods

Density is measured in accordance with ASTM D792. The result is reported in grams (g) per cubic centimeter, or g/cm$^3$.

Melt Index ($I_2$) is measured in accordance with ASTM D-1238 (190° C.; 2.16 kg). The result is reported in grams/10 minutes.

Melt flow rate (MFR) is measured in accordance with ASTM D-1238 (230° C.; 2.16 kg). The result is reported in grams/10 minutes.

Multi-axial Impact Ductile-Brittle Transition Temperature, is measured according to ASTM D3763 (also referred to herein as M-DBTT). The level of low temperature ductility is defined by the ductile-brittle transition temperature in a multi-axial impact test at 6.7 m/s, where 40-60% of a sample set of 25 parts fail in a ductile mode. Test disks were injection molded and then aged for 40 hours after molding at 23° C./50% relative humidity. Parts were then placed in a freezer at testing temperatures for a minimum of 4 hours when testing at sub-ambient temperatures. Parts were tested in 10° C. increments. Samples were tested on an MTS Material test system (Model 319). The ram was driven at a constant velocity, the tup diameter was 0.5 inches in diameter, and the environmental chamber controlled to ±2° C.

Notched-Izod Impact Ductile-Brittle Transition Temperature, is measured according to ASTM D256 (also referred to herein as N-DBTT). Samples were notched 1-16 hours after injection molding. Bars were aged for 40 hours after notching at 23° C./50% relative humidity. Parts were then placed in a freezer at testing temperatures for a minimum of 4 hours when testing at sub-ambient temperatures. Parts were tested in 10° C. increments. The Izod testing equipment did not have an environmental chamber. Individual samples were pulled from the freezer and tested. The Ductile-brittle transition temperature was defined as the point where the average Izod impact strength across the sample set was 4-6 ft lbs/in notch and when the failure modes across the sample set were mixed in type.

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc). With respect to DSC, the temperature at the maximum heat flow rate with respect to a linear baseline is used as the melting point. The linear baseline is constructed from the beginning of the melting (above the glass transition temperature) and to the end of the melting peak. For example, the temperature may be raised from room temperature to 200° C. at 10° C./min, maintained at 200° C. for 5 min, decreased to 0° C. at 10° C./min, maintained at 0° C. for 5 min and then the temperature may be raised from 0° C. to 200° C. at 10° C./min, and the data may be taken from this second heating cycle.

High Temperature Liquid Chromatography (HTLC): High Temperature Liquid Chromatography Experimental Method Instrumentation is the HTLC experiment, which is done according to the published method with minor modifications (Lee, D.; Miller, M. D.; Meunier, D. M.; Lyons, J. W.; Bonner, J. M.; Pell, R. J.; Shan, C. L. P.; Huang, T. J. Chromatogr. A 2011, 1218, 7173). Two Shimadzu (Columbia, Md., USA) LC-20AD pumps are used to deliver decane and trichlorobenzene (TCB) respectively. Each pump is connected to a 10:1 fixed flow splitter (Part #: 620-PO20-HS, Analytical Scientific Instruments Inc., CA, USA). The splitter has a pressure drop of 1500 psi at 0.1 mL/min in $H_2O$ according to the manufacturer. The flow rates of both pumps are set at 0.115 ml/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-µL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 µm particle size) is connected between the injector and a 10-port VICI valve (Houston, Tex., USA). The valve is equipped with two 60-µL sample loops. The valve is used to continuously sample eluent from the first dimension (D1) HTLC column to the second dimension (D2) SEC column. The pump of Waters GPCV2000 and a PLgel Rapid™-M column (10×100 mm, 5 µm particle size) are connected to the VICI valve for D2 size exclusion chromatography (SEC). The symmetric configuration is used for the connections as described in the literature (Brun, Y.; Foster, P. J. Sep. Sci. 2010, 33, 3501). A dual-angle light scattering detector (PD2040, Agilent, Santa Clara, Calif., USA) and an IRS inferred absorbance detector are connected after the SEC column for measurement of concentration, composition, and molecular weight.

Separation for HTLC: Approximately 30 mg are dissolved in 8-mL decane by gently shaking the vial at 160° C. for 2 hours. The decane contains 400 ppm BHT(2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IRS detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-µL aliquot of sample solution is injected into the HTLC column. The injection triggers the gradient described below:

From 0-10 min, 100% decane/0% TCB;

From 10-651 min, TCB is increased linearly from 0% TCB to 80% TCB. The injection also triggers the collection of the light scattering signal at 15° angle (LS15) and the "measure" and "methyl" signals from IRS detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min. Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC: The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit is adjusted to repeat the process.

Each SEC chromatogram n from 1 to 217 yields an X-Y pair in the HTLC chromatogram, where n is the fraction number:

$X_n$=elution volume (mL)=D1 flow rate×n×$t_{switch}$ where $t_{switch}$=3 min is the switch time of the 10-port VICI valve.

$$Y_n = \text{signal intensity (Voltage)} = \sum_{peak\ start}^{peak\ end} IR_{measure,n}$$

The above equation uses $IR_{measure}$ signal as the example. The obtained HTLC chromatogram shows the concentrations of the separated polymeric components as a function of elution volume. The normalized $IR_{measure}$ HTLC chromatogram is with Y represented by dW/dV, meaning the normalized weight fractions with respect to the elution volume.

X-Y pairs of data are also obtained from $IR_{methyl}$ and LS15 signals. The ratio of $IR_{methyl}/IR_{measure}$ is used to calculate composition after calibration. The ratio of LS15/$M_{measure}$ is used to calculate weight-average molecular weight ($M_w$) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, Ω, is determined from the total LS15 signals ($A_{LS15}$) and the total $IR_{measure}$ signals ($A_{IR,measure}$):

$$\Omega = \frac{A_{LS15}}{A_{IR,measure} M_w}$$

The experimental $LS15/IR_{measure}$ ratio is then converted to $M_w$ through Ω.

Atomic Force Microscopy (AFM) is for morphology determination. Pieces from the core of an injection molded, ASTM tensile bar are prepared by punching specimens out of sample and mounting in vice holders. Sampling occurs at the core of the part, looking down the direction of flow. Trapezoids are milled into face with the cryo-mill at ~-120° C. Samples are then polished with cryomicrotomy at -120° C. Two AFM methods are utilized, in one specimens are scanned with a Bruker dimension Icon AFM in Tapping Mode with phase detection. PointProbe NCL probes (~40 N/m) are used with an Ao 1-1.5V and an engage setpoint of 0.85. Lines of resolution is 1024 and scan sizes varies depending on rubber domain size. In the second AFM experiment, Peakforce tapping (PFQNM) mode is used on a Bruker Dimension icon. Bruker Scanasyst-air probes (~0.3 N/m) are used. Typical scan parameters include a 0.5V peak force setpoint, noise threshold of 0.5 nm, peak force amplitude set to 300 nm, Z-range of 4 um, and a peak force setpoint of 0.15V. Lines of resolution is 1024. Scanning software for both methods is Nanoscope with versions varying. Post processing and particle analysis of images are produced in Image Metrology SPIP software with versions varying. A second order average plane fit with a zero order LMS and min set to zero plane fit is used.

Xylene Soluble Fractionation Analysis: is performed by using a weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed.

$^{13}C$ Nuclear Magnetic Resonance (NMR) involves the following:

Sample Preparation: The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters: The data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

Gel Permeation Chromatography (GPC): The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polypropylene} = 0.645(M_{polystyrene})$.

Polypropylene equivalent molecular weight calculations are performed using Viscotek TriSEC software Version 3.0.

Preparation of Block Composites

Block Composite 1 (BC-1) and Block Composite 2 (BC-2) are produced using a catalyst fed simultaneously into two reactors. Each of BC-1 and BC-2 includes (i) an ethylene-propylene polymer, (ii) an isotactic propylene polymer, and (iii) a block copolymer including an ethylene-propylene soft block that has a same composition as the ethylene-propylene polymer and an isotactic polypropylene hard block that has a same composition as the isotactic propylene polymer. With respect to the block copolymers of BC-1 and BC-2, the ethylene-propylene soft blocks are produced in the first reactor and the isotactic propylene hard blocks are produced in the second reactor. The split between soft and hard block in the block copolymer of BC-1 is approximately 60/40. The split between soft and hard block in the block copolymer of BC-2 is approximately 50/50.

BC-1 and BC-2 are prepared using two continuous stirred tank reactors (CSTR) connected in series and using a catalyst fed simultaneously into both reactors. The soft blocks are produced in the first reactor and the hard blocks are produced in the second reactor. Each reactor is hydraulically full and set to operate at steady state conditions. In particular, BC-1 and BC-2 are prepared by flowing monomers, Catalyst, Cocatalyst-1, Cocatalyst-2, and SA (as a chain shuttling agent) according to the process conditions outlined in Table 1, below. Two port injectors are used to feed the Catalyst, Cocatalyst-1, Cocatalyst-2, and SA (shuttling agent)-1, separately into the reactors. For preparation of BC-1 and BC-2, the Catalyst is ([[rel-2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium). The Cocatalyst-1 is a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.) are used. The Cocatalyst-2 is mixed $C_{14-18}$ alkyldimethylammonium salt of bis(tris(pentafluorophenyl)-alumane)-2-undecylimidazolide, prepared according to U.S. Pat. No. 6,395,671, Ex. 16. The SA is a solution of diethylzinc (DEZ) that may contain 1-3 mol % of modified methylalumoxane (MMAO-3A) from Akzo Nobel Chemicals. Upon exiting the reactor, water and/or additives may be injected into the polymer solution.

The process conditions for producing Block Composite 1 and Block Composite 2 are as follows:

TABLE 1

| Conditions | BC-1 | | BC-2 | |
| --- | --- | --- | --- | --- |
| | 1$^{st}$ Reactor | 2$^{nd}$ Reactor | 1$^{st}$ Reactor | 2$^{nd}$ Reactor |
| Reactor Control Temp. (° C.) | 105.14 | 115.09 | 105.4 | 115.7 |
| Solvent Feed (lb/hr) | 290.37 | 120.23 | 469.8 | 489.3 |
| Propylene Feed (lb/hr) | 27.37 | 26.27 | 28.5 | 79.9 |
| Ethylene Feed (lb/hr) | 33.52 | 0 | 52.8 | 0 |
| Reactor Propylene Conc. (g/L) | 2.01 | 1.81 | 2.2 | 2.6 |
| Hydrogen Feed (SCCM) | 9.68 | 9.61 | 0 | 0 |
| Catalyst Flow (lb/hr) | 0.59 | 0.45 | 0.67 | 1.8 |
| Catalyst Conc. (ppm) | 50 | 500 | 75.0 | 300 |
| Cocatalyst-1 Flow (lb/hr) | 0.78 | 0.28 | 0.31 | 1.08 |
| Cocatalyst-1 Conc. (ppm) | 500 | 8000 | 1794.1 | 4692.7 |
| Cocatalyst-2 Flow (lb/hr) | 1.02 | 0.50 | 0.47 | 0.74 |
| Cocatalyst-2 Conc. (ppm) | 1993 | 996 | 494.3 | 1196.1 |
| SA Flow (lb/hr) | 1.62 | 0 | 2.82 | 0 |
| SA Concentration (ppm) | 29987 | 0 | 25997.7 | 0 |

Each of the resultant BC-1 and BC-2 includes an ethylene-propylene (EP) polymer, an isotactic polypropylene (iPP) polymer, and an EP-iPP block copolymer.

The characteristics of BC-1 and BC-2 are shown in Table 2, below

TABLE 2

| | MFR (g/10 min at 230° C. and 2.16 kg) | Density (g/cm$^3$) | Mw Kg/mol | Mw/Mn | Total C$_2$ (wt %) | Tm (° C.) | Tc (° C.) | Tg (° C.) | Melt Enthalpy (J/g) |
| --- | --- | --- | --- | --- | --- | --- | --- | --- | --- |
| BC-1 | 4.8 | 0.868 | 119 | 2.44 | 39.9 | 139.4 | 85.7 | −50.4 | 33.9 |
| BC-2 | 6.2 | 0.879 | 133.3 | 2.67 | 33.1 | 137.4 | 97.5 | −49.0 | 56.9 |

Block Composite 1 has a Block Composite Index (BCI) of 0.470. Block Composite 2 has a BCI of 0.444. The term BCI is herein defined to equal the weight percentage of the block copolymer divided by 100% (i.e. weight fraction). The value of the block composite index can range from 0 up to 1.0, whereas 1.0 would be equal to 100% of the block copolymer and zero would be for a material such as a traditional blend or random copolymer. Said in another way, for an insoluble fraction, the BCI is 1.000, and for a soluble fraction the BCI is assigned a value of zero.

In particular, the BCI is based on showing that insoluble fractions contain an appreciable amount of ethylene that would not otherwise be present if the polymer were simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions. To account for this "extra ethylene", a mass balance calculation can be performed to estimate a block composite index from an amount of xylene insoluble and soluble fractions and a weight % ethylene present in each of the fractions.

A summation of the weight % ethylene from each fraction according to Equation 1 results in an overall weight % ethylene (in the polymer). This mass balance equation can also be used to quantify the amount of each component in a binary blend or extended to a ternary, or n-component blend.

$$\text{Wt \%} \ C_{2_{Overall}} = w_{Insoluble}(\text{wt \%} C_{2_{Insoluble}}) + w_{soluble}(\text{wt \%} C_{2_{soluble}}) \quad \text{Eq. 1}$$

Applying equations 2 through 4, the amount of the soft block (providing the source of the extra ethylene) present in the insoluble fraction is calculated. By substituting the weight % C$_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$\text{Wt \%} \ C_{2_{Overall \ or \ xylene \ insoluble}} = w_{iPPHard}(\text{wt \%} \ C_{2_{iPP}}) + w_{EPsoft}(\text{wt \%} \ C_{2_{EPsoft}}) \quad \text{Eq. 2}$$

$$w_{iPPhard} = \frac{\text{wt \%} \ C_{2_{overall \ or \ xylene \ insoluble}} - \text{wt \%} \ C_{2_{EPsoft}}}{\text{wt \%} \ C_{2_{iPPhard}} - \text{wt \%} \ C_{2_{EPsoft}}} \quad \text{Eq. 3}$$

$$w_{EPsoft} = 1 - w_{iPPHard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it may reduce the possibility of and/or prevent the EP block from solubilizing.

In particular, for Block Composite 1 and Block Composite 2 used herein, the BCI values are calculated as shown below in Table 3.

TABLE 3

| Line # | Variable | Source | BC-1 | BC-2 |
|---|---|---|---|---|
| 1 | Overall wt % C2 Total | Measured | 39.9 | 33.1 |
| 2 | wt % C2 in PP block/polymer | Measured | 0.5 | 0.5 |
| 3 | wt % C2 in EP block/polymer | Measured | 65 | 65 |
| 4 | wt fraction iPP (in block or polymer) | Calculated | 0.389 | 0.495 |
| 5 | wt fraction EP (in block or polymer) | Calculated | 0.611 | 0.505 |
| 6 | Analysis of HTLC Separation | — | | |
| 7 | wt fraction xylene soluble | Measured | 0.502 | 0.281 |
| 8 | wt fraction xylene insoluble | Measured | 0.498 | 0.719 |
| 9 | wt % C2 in xylene insoluble | Measured | 37.7 | 20.6 |
| 10 | wt fraction PP in insoluble | Calculated | 0.423 | 0.688 |
| 11 | wt fraction EP in insoluble fraction | 1-Line 10 | 0.577 | 0.312 |
| 12 | wt fraction Diblock in insoluble fraction | Line 11/Line 5 | 0.944 | 0.618 |
| 13 | Block Composite Index (BCI) | Calculated | 0.470 | 0.444 |

To estimate the BCI, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

For example, if an iPP-EP polymer contains an overall of 47 wt % $C_2$ and is made under the conditions to produce an EP soft polymer with 67 wt % $C_2$ and an iPP homopolymer containing zero ethylene, the amount of EP soft and iPP hard is 70 wt % and 30 wt %, respectively. If the percent of EP is 70 wt % and the iPP is 30 wt %, the relative ratio of the EPDM:iPP blocks could be expressed as 2.33:1. Hence, if one skilled in the art, carries out a xylene extraction of the polymer and recovers 40 wt % insoluble and 60 wt % soluble, this would be an unexpected result and this would lead to the conclusion that a fraction of the block copolymer was present. If the ethylene content of the insoluble fraction is subsequently measured to be 25 wt % $C_2$, Equations 2 thru 4 can be solved to account for this additional ethylene and result in 37.3 wt % EP soft polymer and 62.7 wt % iPP hard polymer present in the insoluble fraction.

Depending on the estimations made of the total polymer composition and the error in the analytical measurements which are used to estimate the composition of the hard and soft blocks, between 5 to 10% relative error is possible in the computed value of the block composite index. Such estimations include the wt % C2 in the iPP hard block as measured from the DSC melting point, NMR analysis, or process conditions; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EPDM polymer chain must be connected to an iPP polymer block (or else it would have been extracted into the xylene soluble fraction).

BC-1 and BC-2 are further blended to prepare the Modifiers, as discussed below.

Preparation of Modifiers

The modifiers are a blend of either BC-1 or BC-2 with a high melt flow polyolefin copolymer.

In particular, the materials principally used are the following:

| | |
|---|---|
| Block Composite 1 (BC-1) | The Block Composite 1 discussed above that includes block copolymers having 60 wt % of EP soft blocks (with 65 wt % of ethylene, based on the total weight of the EP block) and 40 wt % of iPP hard blocks. |
| Block Composite 2 (BC-2) | The Block Composite 2 discussed above that includes block copolymers having 50 wt % of EP soft blocks (with 65 wt % of ethylene, based on the total weight of the EP block) and 50 wt % of iPP hard blocks. |
| Polyolefin Elastomer 1 | An ethylene-octene polyolefin elastomer having a melt index of 13 g/10 min (according to ASTM D1238 and at 190° C./2.16 kg), a density of 0.864 g/cm$^3$ (according to ASTM D792), a Mooney Viscosity of 4 MU (ML 1 + 4 at 121° C., according to ASTM D-1646), a DSC melting point of 56° C. (at rate of 10° C./min), and glass transition temperature of −55° C. (available as ENGAGE ™ 8137 from The Dow Chemical Company). |
| Polyolefin Elastomer 2 | An ethylene-octene polyolefin elastomer having a melt index of 30 g/10 min (according to ASTM D1238 and at 190° C./2.16 kg), a density of 0.870 g/cm$^3$ (according to ASTM D792), a Mooney Viscosity of 2 MU (ML 1 + 4 at 121° C., according to ASTM D-1646), a DSC melting point of 65° C. (at rate of 10° C./min), and glass transition temperature of −54° C. (available as ENGAGE ™ 8407 from The Dow Chemical Company). |
| Polyolefin Elastomer A | An ethylene-octene polyolefin elastomer having a melt index of 1 g/10 min (according to ASTM D1238 and at 190° C./2.16 kg), a density of 0.857 g/cm$^3$ (according to ASTM D792), a Mooney Viscosity of 25 MU (ML 1 + 4 at 121° C., according to ASTM D-1646), a DSC melting point of 38° C. (at rate of 10° C./min), and glass transition temperature of −58° C. (available as ENGAGE ™ 8842 from The Dow Chemical Company). |
| Polyolefin Elastomer B | An ethylene-octene polyolefin elastomer having a melt index of 1 g/10 min (according to ASTM D1238 and at 190° C./2.16 kg), a density of 0.870 g/cm$^3$ (according to ASTM D792), a Mooney Viscosity of 24 MU (ML 1 + 4 at 121° C., according to ASTM D-1646), a DSC melting point of 60° C. (at rate of 10° C./min), and glass transition temperature of −52° C. (available as ENGAGE ™ 8100 from The Dow Chemical Company). |

A First Modifier is prepared using 20 wt % of Block Composite 1 and 80 wt % of the Polyolefin Elastomer 1, based on the total weight of the First Modifier. A Second Modifier is prepared using 20 wt % of Block Composite 1 and 80 wt % of the Polyolefin Elastomer 2, based on the total weight of the Second Modifier. A Third Modifier is prepared using 10 wt % of Block Composite 2 and 90 wt % of the Polyolefin Elastomer 1, based on the total weight of the Third Modifier.

A First Comparative Modifier is prepared using 20 wt % of Block Composite 1 and 80 wt % of the Polyolefin Elastomer A, based on the total weight of the First Comparative Modifier. A Second Comparative Modifier is prepared using 20 wt % of Block Composite 1 and 80 wt % of the Polyolefin Elastomer B, based on the total weight of the Second Comparative Modifier.

In particular, the First, Second, and Third Modifiers and the First and Second Comparative Modifiers are prepared by melt blending on a 30 mm, ZSK Werner Pleiderer twin-screw extruder at a screw speed of 250 RPM. The components are fed into the extruder using individual loss/weight feeders. The antioxidant additive is tumble blended with the elastomer ahead of compounding. The compounding extruder feed rate is 25 lbs/hr with a melt temperature range of 200° C. to 220° C. (430° F.). Further, the temperature profile is as follows:

|  | Set Point |
|---|---|
| Zone #1 | 120° C. |
| Zone #2 | 160° C. |
| Zone #3 | 160° C. |
| Zone #4 | 160° C. |
| Zone #5 | 140° C. |
| Zone #6 | 140° C. |
| Zone #7 | 140° C. |
| Zone #8 | 140° C. |
| Die | 165° C. |

Preparation of Working Examples and Comparative Examples

For the Working Examples, blended compositions are formed according to the formulations in Tables 4 and 5. Then, specimens prepared using the respective blended compositions are evaluated for multi-axial impact ductile-brittle transition temperature (hereafter referred to as M-DBTT) and/or Notched Izod ductile-brittle transition temperature (hereafter referred to as N-DBTT).

In particular, the materials principally used are the following:

| First Modifier | A pre-blended modifier as discussed above that includes 20 wt % of Block Composite 1 and 80 wt % of the Polyolefin Elastomer 1. |
|---|---|
| Second Modifier | A pre-blended modifier as discussed above that includes 20 wt % of Block Composite 1 and 80 wt % of the Polyolefin Elastomer 2. |
| Third Modifier | A pre-blended modifier as discussed above that includes 10 wt % of Block Composite 2 and 90 wt % of the Polyolefin Elastomer 1. |
| First Comparative Modifier | A pre-blended modifier as discussed above that includes 20 wt % of Block Composite 1 and 80 wt % of the Polyolefin Elastomer A. |
| Second Comparative Modifier | A pre-blended modifier as discussed above that includes 20 wt % of Block Composite 1 and 80 wt % of the Polyolefin Elastomer B. |
| 70 MFR hPP | A polypropylene homopolymer, having a melt flow rate of 70 g/10 min (according to ASTM D-1238 and at 230° C./2.16 kg) (available as Adstif HA801U from Lyondellbasel). |
| 110 MFR hPP | A polypropylene homopolymer, having a melt flow rate of 110 g/10 min (according ASTM D-1238 and at 230° C./2.16 kg) (available as F1000HC from Braskem). |
| ICP | A high crystalline propylene impact copolymer having a melt flow rate of 60 g/10 min (according to ASTM D-1238 and at 230° C./2.16 kg) (available as YUPLENE ® BX3900 from SK Global Chemical). |
| Talc | A talc additive, having a median particle size of 1.5 microns (available as JetFil ® 700C from Imerys Talc). |
| Stabilizer | A stabilizer additive (available as Irganox ® B 225 from BASF). |
| Amide | An erucamide lubricant (available as Kemamide ® E Ultra from Pmc Biogenix). |

Working Examples 1 and 2 and Comparative Examples A to F are prepared according to the formulations in Table 4, below, in which the TPO blends use a relatively high MFR polypropylene homopolymer:

TABLE 4

|  | Ex. 1 | Ex. A | Ex. 2 | Ex. B | Ex. C | Ex. D | Ex. E | Ex. F |
|---|---|---|---|---|---|---|---|---|
| Composition (wt %, based on total weight of the composition) | | | | | | | | |
| First Modifier | 30.0 | — | — | — | — | — | — | — |
| Polyolefin Elastomer 1 | — | 30.0 | — | — | — | — | — | — |
| Second Modifier | — | — | 30.0 | — | — | — | — | — |
| Polyolefin Elastomer 2 | — | — | — | 30.0 | — | — | — | — |
| First Comparative Modifier | — | — | — | — | 30.0 | — | — | — |
| Polyolefin Elastomer A | — | — | — | — | — | 30.0 | — | — |
| Second Comparative Modifier | — | — | — | — | — | — | 30.0 | — |
| Polyolefin Elastomer B | — | — | — | — | — | — | — | 30.0 |
| 70 MFR hPP | 49.4 | 49.4 | 49.4 | 49.4 | 49.4 | 49.4 | 49.4 | 49.4 |
| Talc | 20.0 | 20.0 | 20.0 | 20.0 | 20.0 | 20.0 | 20.0 | 20.0 |
| Stabilizer | 0.3 | 0.3 | 0.3 | 0.3 | 0.3 | 0.3 | 0.3 | 0.3 |
| Amide | 0.3 | 0.3 | 0.3 | 0.3 | 0.3 | 0.3 | 0.3 | 0.3 |
| Properties | | | | | | | | |
| Blended MFR | 37 | 49 | 57 | 61 | 18 | 20 | 21 | 21 |
| MFR Ratio* | 1.9 | 1.4 | 1.2 | 1.1 | 3.9 | 3.5 | 3.3 | 3.3 |
| M-DBTT (° C.) | −20 | 5 | −5 | 10 | −30 | −25 | −25 | −15 |
| Delta | 25 | | 15 | | 5 | | 10 | |
| N-DBTT (° C.) | 10 | −10 | 23 | 23 | −35 | −30 | −15 | −30 |
| Delta | −20 | | 0 | | 5 | | −15 | |

*Ratio of MFR of base hPP/Blended MFR, which represents the change in MFR.

Referring to Example 1, it is seen that inclusion of the First Modifier, which includes Block Composite 1 and the Polyolefin Elastomer 1, maintains a sufficiently high blended MFR (and low MFR Ratio) and decreases the M-DBTT, relative to inclusion of the Polyolefin Elastomer 1 without Block Composite 1 in Comparative Example A. Referring to Example 2, it is seen that inclusion of the Second Modifier, which includes Block Composite 1 and the Polyolefin Elastomer 2, maintains a sufficiently high blended MFR (and low MFR Ratio) and decreases the M-DBTT, relative to inclusion of the Polyolefin Elastomer 2 without Block Composite 1 in Comparative Example B. Referring to Comparative Examples C, D, E, and F, it is seen that when relatively low melt flow rate elastomers (at differing densities) are used with or without Block Composite 1, the blended MFR is not sufficiently high and the MFR Ratio is very high.

Figure 1:
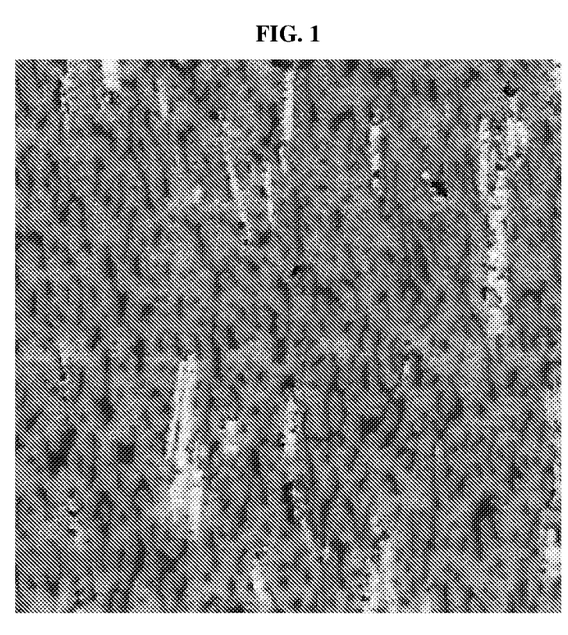
FIG. 1 illustrates an atomic force microscopy phase image showing the morphology of Working Example 1 at a scale of 10 microns by 10 microns for a full image.
Figure 2:
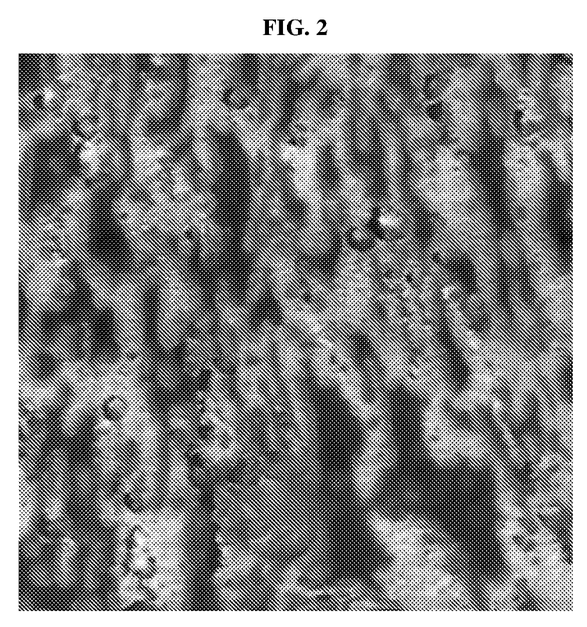
FIG. 2 illustrates an atomic force microscopy phase image showing the morphology of Comparative Example A at a scale of 10 microns by 10 microns for a full image.
Figure 3:
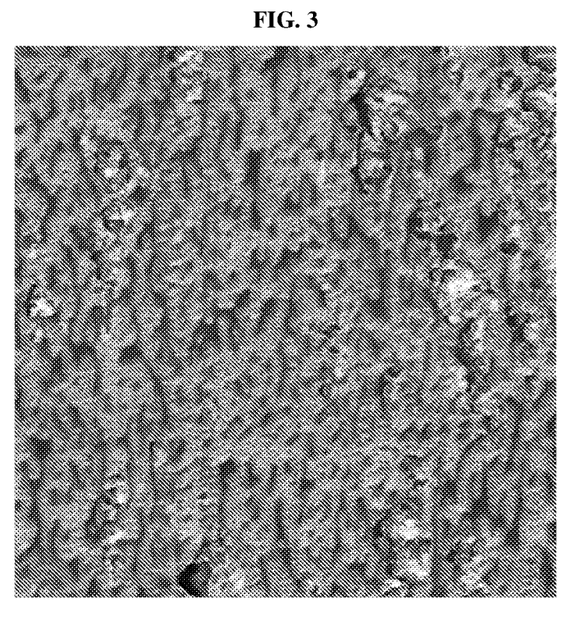
FIG. 3 illustrates an atomic force microscopy phase image showing the morphology of Working Example 2 at a scale of 10 microns by 10 microns for a full image.
Figure 4:
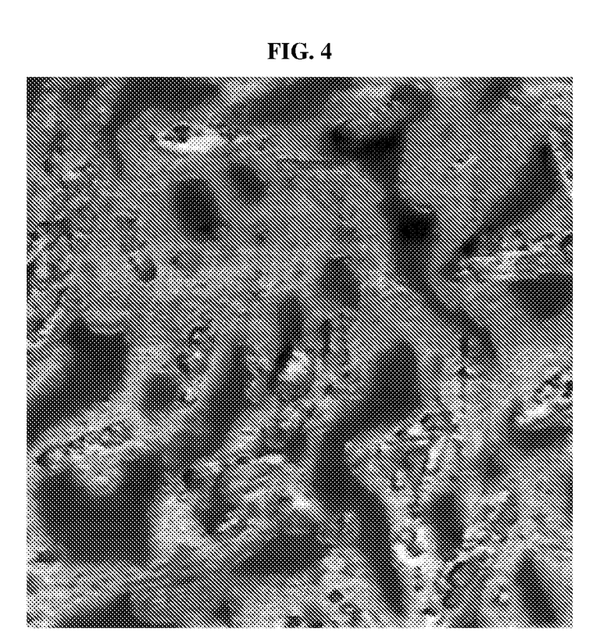
FIG. 4 illustrates an atomic force microscopy phase image showing the morphology of Comparative Example B at a scale of 10 microns by 10 microns for a full image.
Figure 5:
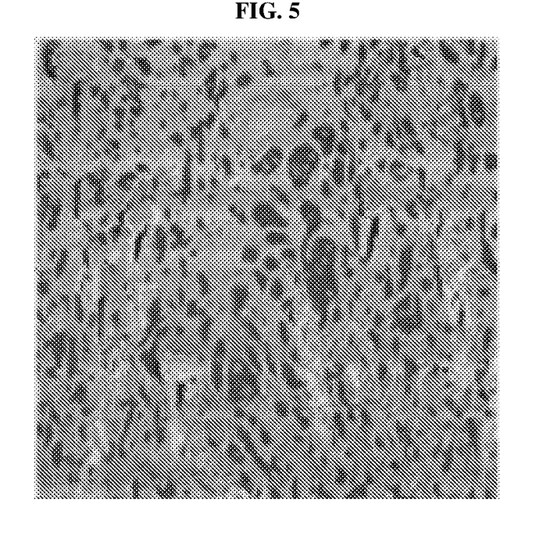
FIG. 5 illustrates an atomic force microscopy phase image showing the morphology of Working Example 5 at a scale of 10 microns by 10 microns for a full image.
Figure 6:
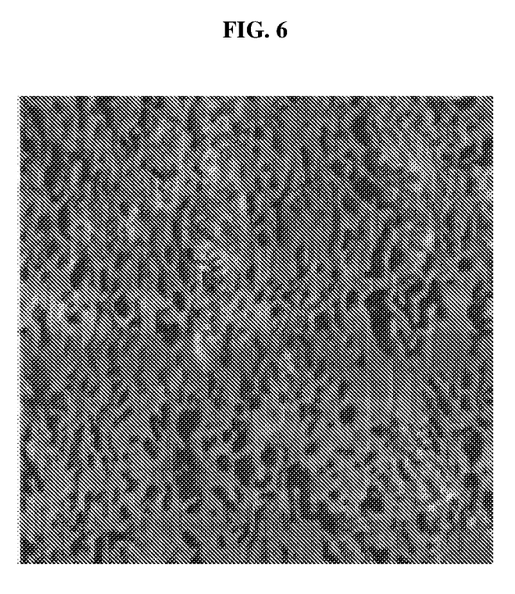
FIG. 6 illustrates an atomic force microscopy phase image showing the morphology of Comparative Example I at a scale of 10 microns by 10 microns for a full image

Further, FIG. 1 illustrates the atomic force microscopy image showing the morphology of Working Example 1, in which a significantly smaller rubber domain size and improved dispersion are achieved when adding Block Composite 1 to the thermoplastic polyolefin compound with very low matrix viscosity, as compared to FIG. 2 that illustrates the atomic force microscopy image of Comparative Example A. Further, FIG. 3 illustrates the atomic force microscopy image of Working Example 2, and FIG. 4 illustrates the atomic force microscopy image of Comparative Example B. Further, FIG. 5 illustrates the atomic force microscopy image of Working Example 5, and FIG. 6 illustrates the atomic force microscopy image of Comparative Example I.

Working Examples 3 to 5 and Comparative Examples G to I are prepared according to the formulations in Table 5, below, in which the TPO blends use a relatively higher MFR polypropylene homopolymer or a polypropylene impact copolymer:

TABLE 5

|  | Ex. 3 | Ex. G | Ex. 4 | Ex. H | Ex. 5 | Ex. I |
|---|---|---|---|---|---|---|
| Composition (wt %, based on total weight of the composition) | | | | | | |
| First Modifier | 30.0 | — | — | — | — | — |
| Polyolefin Elastomer 1 | — | 30.0 | — | — | — | 35.0 |
| Second Modifier | — | — | 30.0 | — | — | — |
| Polyolefin Elastomer 2 | — | — | — | 30.0 | — | — |
| Third Modifier | — | — | — | — | 35.0 | — |
| 110 MFR hPP | 49.4 | 49.4 | 49.4 | 49.4 | — | — |
| ICP | — | — | — | — | 44.4 | 44.4 |
| Talc | 20.0 | 20.0 | 20.0 | 20.0 | 20.0 | 20.0 |
| Stabilizer | 0.3 | 0.3 | 0.3 | 0.3 | 0.3 | 0.3 |
| Amide | 0.3 | 0.3 | 0.3 | 0.3 | 0.3 | 0.3 |
| Properties | | | | | | |
| Blended MFR | 59 | 67 | 76 | 88 | 34 | 33 |
| MFR Ratio* | 1.9 | 1.6 | 1.4 | 1.3 | 1.8 | 1.8 |
| M-DBTT (° C.) | −25 | 10 | −5 | 10 | −35 | −25 |
| Delta | 35 | | 15 | | 10 | |
| N-DBTT (° C.) | 10 | 23 | 23 | 30 | 0 | −10 |
| Delta | 13 | | 7 | | −10 | |

*Ratio of MFR of base hPP/Blended MFR, which represents the change in MFR.

Referring to Example 3, it is seen that inclusion of the First Modifier, which includes Block Composite 1 and the Polyolefin Elastomer 1, maintains a sufficiently high blended MFR (and low MFR Ratio) and decreases both the M-DBTT and the N-DBTT, relative to inclusion of the Polyolefin Elastomer 1 without Block Composite 1 in Comparative Example G. Referring to Example 4, it is seen that inclusion of the Second Modifier, which includes Block Composite 1 and the Polyolefin Elastomer 2, maintains a sufficiently high blended MFR (and low MFR Ratio) and decreases both the M-DBTT and the N-DBTT, relative to inclusion of the Polyolefin Elastomer 2 without Block Composite 1 in Comparative Example H. Referring to Example 5, it is seen that inclusion of the Third Modifier, which includes Block Composite 2 and the Polyolefin Elastomer 1, maintains a sufficiently high blended MFR (and low MFR Ratio) and decreases the M-DBTT, relative to inclusion of the Polyolefin Elastomer 1 without Block Composite 2 in Comparative Example I.

Referring to Tables 4 and 5, the presence of a block composite becomes more important to the ability to achieve a lower DBTT as the viscosity of the propylene base polymer decreases and the melt flow rate of the propylene base polymer increases.

Specimens for Working Examples 1 to 5 and Comparative Examples A to I are prepared by first melt blending and then injection molding. In particular, the modifier, the polypropylene homopolymer, and talc, are prepared by melt blending on a 30 mm, ZSK Werner Pleiderer twin-screw extruder at a speed of 350 RPM. The components are fed into the extruder feed hopper using individual loss/weight feeders for pellets and powders. The antioxidant and lubricant additives are tumble blended with the talc ahead of compounding. The compounding extruder rate is 40-50 lbs/hour with a melt temperature range of 240° C. to 270° C. (430° F.). Further, the temperature profile is as follows:

|  | Set Point |
|---|---|
| Zone #1 | 140° C. |
| Zone #2 | 190° C. |
| Zone #3 | 200° C. |
| Zone #4 | 210° C. |
| Zone #5 | 210° C. |
| Zone #6 | 215° C. |
| Zone #7 | 220° C. |
| Zone #8 | 220° C. |
| Die | 225° C. |

Further, injection molded specimens are produced on a Toyo 110 ton electric injection molding machine. A 90 ton clamp tonnage is used for all trials. Transfer from fill to pack is done on screw position. Molding is done in accordance with ASTM 3641. For the Izod specimens, the mold is a 2 cavity ASTM type 1 Tensile Bar, which Izod specimens are cut for N-DBTT measurements. Resultant parts are then placed in a ziplock bag and put into a conditioned room 73° F./50% humidity room before notching. Notching takes place within 1-16 hours after molding.

M-DBTT is tested on 4 inch diameter injection molded disks with a thickness of 3.175 mm. The 4" diameter disk mold is a single cavity mold. The mold is heated to 32° C. using cooling water and an external Matsui mold controller. The parts are filled using a single tab gate. The injection molding conditions for the N-DBTT specimens are as follows:

TABLE 6

| Barrel Temperature (Zone 1, 2, 3, 4, Nozzle) | ° C. | 227/227/227/227/227 |
|---|---|---|
| Mold Temperature | ° C. | 32 |
| Hold Time | s | 23 |
| Hold Pressure | (psi) × 10R | 550 |
| Cooling Time | s | 25 |
| Back Pressure | (psi) × 10R | 85 |
| Fill Time | s | 1.1 |
| Screw Speed | rpm | 85 |
| Injection Speed | cc/s | 35 |
| Decompression | cc | 1.5 |

The injection molding conditions for the M-DBTT specimens are as follows:

TABLE 7

| Barrel Temperature (Zone 1, 2, 3, 4, Nozzle) | ° C. | 227/227/227/227/227 |
|---|---|---|
| Mold Temperature | ° C. | 32 |
| Hold Time | s | 18 |
| Hold Pressure | (psi) × 10R | 550 |
| Cooling Time | s | 25 |
| Back Pressure | (psi) × 10R | 85 |
| Fill Time | s | .9 |
| Screw Speed | rpm | 85 |
| Injection Speed | cc/s | 35 |
| Decompression | cc | 1.5 |

What is claimed is:

1. A high melt flow thermoplastic polyolefin composition, comprising:
   from 5 wt % to 45 wt % of a modifier including:
   (a) from 5 wt % to 40 wt % of a block composite, based on a total weight of the modifier, the block composite including (i) an ethylene-propylene copolymer, (ii) an isotactic polypropylene polymer, and (iii) a block copolymer including an ethylene-propylene soft block that has essentially a same composition as the ethylene-propylene polymer and an isotactic polypropylene hard block that has essentially a same composition as the isotactic polypropylene polymer, the soft block comprising from 20 wt % to 80 wt % of ethylene based on a total weight of the soft block, and the block copolymer including from 20 wt % to 75 wt % of the hard block, based on the total weight of the block copolymer, and (b) from 60 wt % to 95 wt % of a polyolefin copolymer, based on a total weight of the modifier, the polyolefin copolymer being derived from ethylene and at least one of a $C_3$ to $C_{10}$ alpha-olefin, and the polyolefin copolymer having a melt index from 10 g/10 min to 1500 g/10 min, according to ASTM D1238 and at 190° C./2.16 kg, and a density from 0.850 g/cm³ to 0.900 g/cm³, and from 30 wt % to 95 wt % of a polypropylene polymer base that has a melt flow rate of at least 40 g/10 min, according to ASTM D 1238 and at 230° C./2.16 kg, wherein the high melt flow thermoplastic polyolefin composition has a blended melt flow rate of at least 25 g/10 min, according to ASTM D1238 and at 230° C./2.16 kg, and an MFR ratio is less than 2.0, the MFR ratio being a ratio of the melt flow rate of the polypropylene polymer base to the blended melt flow rate of the high melt flow thermoplastic polyolefin composition.

2. The composition as claimed in claim 1, wherein a multi-axial impact ductile brittle transition temperature measured according to ASTM D 3763, for an injection molded article formed using the high melt flow thermoplastic polyolefin composition, is less than 0° C.

3. The composition as claimed in claim 1, wherein a multi-axial impact ductile-brittle transition temperature measured according to ASTM D 3763 and/or a notched-izod impact ductile-brittle transition temperature measured according to ASTM D 256, for an injection molded article formed using the high melt flow thermoplastic polyolefin composition, is at least 5° C. lower for the high melt flow thermoplastic polyolefin composition than another composition that includes the same components except the block composite is excluded, when the multi-axial impact ductile-brittle transition temperature and/or the notched-izod impact ductile-brittle transition temperature is measured at the same conditions for both the high melt flow thermoplastic polyolefin composition and the other composition.

4. The composition as claimed in claim 1, wherein the blended melt flow rate is from 30 g/10 min to 100 g/10 min, according to ASTM D1238 and at 230° C./2.16 kg.

5. The composition as claimed in claim 1, wherein the block composite has a melt flow rate from 2 g/10 min to 100 g/10 min, according to ASTM D 1238 and at 230° C./2.16 kg.

6. The composition as claimed in claim 1, wherein the block composite and the polyolefin copolymer of the modifier are pre-blended prior to blending the modifier with the polypropylene polymer base, the composition including the modifier finely dispersed in the polypropylene polymer.

7. The composition as claimed in claim 1, wherein the melt flow rate of the polypropylene polymer base is at least 60 g/10 min.

8. An injection molded article prepared using the composition as claimed in claim 1.

9. The injection molded article as claimed in claim 8, wherein the article is an interior or exterior use automotive part.

10. A method of preparing a high melt flow thermoplastic polyolefin composition, the method comprising:

forming a modifier by blending:

(a) from 5 wt % to 40 wt % of a block composite, based on a total weight of the modifier, the block composite including (i) an ethylene-propylene copolymer, (ii) an isotactic polypropylene polymer, and (iii) a block copolymer including an ethylene-propylene soft block that has a same composition as the ethylene-propylene polymer and an isotactic polypropylene hard block that has a same composition as the isotactic polypropylene polymer, the soft block comprising from 20 wt % to 80 wt % of ethylene based on a total weight of the soft block, and the block copolymer including from 20 wt % to 75 wt % of the hard block, based on the total weight of the block copolymer, and (b) from 60 wt % to 95 wt % of a polyolefin copolymer, based on a total weight of the modifier, the polyolefin copolymer being derived from ethylene and at least one of a $C_3$ to $C_{10}$ alpha-olefin, and the polyolefin copolymer having a melt index from 10 g/10 min to 1500 g/10 min, according to ASTM D1238 and at 190° C./2.16 kg, and a density from 0.860 g/cm³ to 0.900 g/cm³, and blending from 30 wt % to 95 wt % of a polypropylene polymer base that has a melt flow rate of at least 40 g/10 min, according to ASTM D 1238 and at 230° C./2.16 kg, with 5 wt % to 45 wt % of the modifier, the resultant high melt flow thermoplastic polyolefin composition having a blended melt flow rate of at least 25 g/10 min, according to ASTM D1238 and at 230° C./2.16 kg, and an MFR ratio of less than 2.0, the MFR ratio being a ratio of the melt flow rate of the polypropylene polymer base to the blended melt flow rate of the high melt flow thermoplastic polyolefin composition.

* * * * *